United States Patent Office 2,848,484
Patented Aug. 19, 1958

2,848,484
ALKOXY DIAMINOSTILBENEDISULFONIC ACIDS

Robert S. Long, Bound Brook, and Alice K. Kantor, Plainfield, N. J., assignors to American Cyanamid Company, New York, N. Y., a corporation of Maine No Drawing. Application October 17, 1955
Serial No. 541,074

4 Claims. (Cl. 260—507)

This invention relates to new optical bleaching agents and more specifically to new optical bleaching agents of the formula:

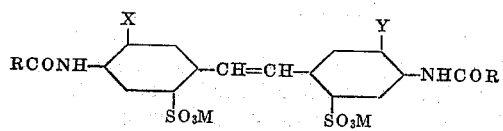

in which X is an alkoxy group, Y is selected from the group consisting of chloro and alkoxy, R is an aryl radical and M is hydrogen, an alkali metal cation or ammonium. The new compounds of this invention are useful as brighteners for cotton.

The use of optical bleaching agents to compensate for the natural yellowing of fibers has become common in the art. These compounds absorb ultra-violet light and re-emit light in the blue range, thus, automatically compensating for the yellow of the fiber. Since more visible light is reflected than is incident upon the fiber, the cloth actually appears to be whiter than ordinary white bleached cloth. Such compounds must have affinity for the fiber and their fluorescence must be in the blue range. The additive effect of yellow reflected light and blue fluorescence which results in an overall increase in total reflected light sharply differentiates this type of bleaching from the subtractive effect obtained when one uses the older type of bluing which dyed the cloth a blue to compensate for the yellow.

It is essential in these compounds that the fluorescence be as much as possible a true blue. However, many brighteners are quite usable which fluoresce either reddish or greenish shades of blue. Many brighteners have been described in the prior art as being derived from diaminostilbene disulfonic acid. Most of these fluoresce a reddish shade of blue. Brighteners derived from chlorinated diaminostilbene disulfonic acids have been described. Even these have a distinctly reddish shade of blue fluorescence. The compounds which form our invention possess a greenish shade of blue fluorescence which had been obtainable heretofore only with other, more expensive, intermediates. It is most surprising that the replacement of even one chlorine in a dichloro-diaminostilbene disulfonic acid with an alkoxy group will give an intermediate from which greenish shade brighteners can be obtained. One would not expect this change to have such a marked effect on the shade of fluorescence as to shift it from reddish blue to a greenish blue.

The compounds of our invention are useful in brightening cotton. They can be used by themselves or they can be used in blends with redder shade brighteners to produce a neutral blue fluorescent effect on the cloth.

The compounds of our invention may be prepared in a number of ways. The appropriate 5-alkoxy-4-nitrotoluene-2-sulfonic acid may be oxidized directly with sodium hypochlorite to form the 5,5'-dialkoxy-4,4'-dinitrostilbene-2,2'-disulfonic acid which can then be reduced and acylated. The toluene derivative from which this process starts is prepared from the corresponding chloro compound by reaction with a sodium alkoxide, such as sodium methoxide, sodium ethoxide, or the like.

The reduction of the nitrostilbene is carried out by known methods and the corresponding diamino-dialkoxystilbene-disulfonic acids which are formed are themselves new compounds which form a further aspect of our invention.

The compounds of our invention can also be prepared by forming the dichloro-dinitrostilbene-disulfonic acids by known methods and treating the same with a sodium alkoxide. We have found that in such a preparation a most surprising phenomenon is observed. Even with a large excess of sodium alkoxide, only one of the chlorine atoms is replaceable by alkoxy under the conditions used and thus, the compounds of our invention which are unsymmetrical are best prepared in this manner.

The acylation of the intermediate diaminostilbene derivatives is carried out by known methods using a variety of acylating agents. Among the acylating agents which may be used there can be cited benzoyl chloride and its derivatives such as 2,4-dimethoxybenzoyl chloride, 2,4-diethoxybenzoyl chloride, o-methoxybenzoyl chloride, o-ethoxybenzoyl chloride, 2,5-dimethoxybenzoyl chloride, 2,5-diethoxybenzoyl chloride, p-methyl-o-methoxybenzoyl chloride, p-methoxybenzoyl chloride, p-benzoylaminobenzoyl chloride and the like; other aromatic acid chlorides such as the naphthoyl chlorides, diphenyl-4-carboxy chloride, and the like; triazine chlorides such as cyanuric chloride; and heterocyclic acid chlorides such as nicotinoyl chloride, picolinoyl chloride, thenoyl chloride and similar acid chlorides. Since the triazine residue is used in the brightener art to replace acyl groups in brightener structures, the term acyl must be interpreted to include this type of radical. When a chloro triazine such as cyanuric chloride is used, it can be condensed with either one or two mols of the alkoxy substituted diaminostilbene disulfonic acids or the diaminostilbene derivative can be condensed with two cyanuric chlorides. In such case, the other chlorines in the triazine nucleous can be replaced with a variety of groups such as hydroxyl, alkoxy, phenoxy, anilino, morpholino, bis-β hydroxy ethylamino, mono-β-hydroxy ethylamino and the like in any combination desired. Any amino groups on stilbene moieties which have not been acylated can be further acylated with benzoyl chloride derivatives, or other agents such as those mentioned above. In order to obtain the best brightening effect, all the free amino groups should be acylated in one way or another.

The brighteners of our invention are sulfonic acids or their salts. In order to get application to the cloth the salts must be soluble in water. It is therefore preferable to use the alkali metal or ammonium salts, although in some case is the brighteners of our invention may be dyed on cotton using a bath containing soap solutions, or they may be applied by any of the usual laundry techniques. They are primarily brighteners for cotton but have substantivity on viscose rayon. Under the proper conditions, that is, slightly acid baths, the compounds of our invention will also show substantivity to nylon and to animal fibers, such as wool and silk.

It is an advantage of the brighteners of our invention that they have very similar substantivity on cotton to that of the other diaminostilbene type brighteners. They are therefore very compatible with such brighteners in the formation of blends of a neutral blue fluorescence.

Our invention can be illustrated by the following examples in which the parts are by weight unless otherwise specified.

*Example 1*

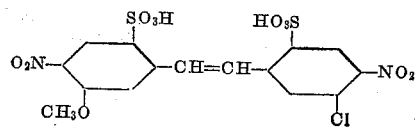

A mixture of 4 parts of disodium 5,5'-dichloro-4,4'-dinitrostilbene-2,2'-disulfonate, 119 parts of methanol and 2.65 parts of sodium methylate is refluxed for 20 hours. A small amount of alcohol-insoluble material is separated by filtration from the hot solution. The alcohol solution is then evaporated and cooled. The product, which is the disodium salt of 5-methoxy-5'-chloro-4,4'-dinitrostilbene-2,2'-disulfonic acid, is isolated by filtration and dried.

*Example 2*

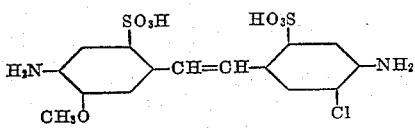

A mixture of 10 parts of Master Builders Iron Grade D, 100 parts of water and 0.5 part by volume of glacial acetic acid is heated to reflux. A solution of 2.5 parts of 5-methoxy-5'-chloro-4,4'-dinitrostilbene-2,2'-disulfonic acid disodium salt in 35 parts of water is added to the mixture. The refluxing is continued until reduction is complete. The reaction mixture is then made alkaline by the addition of 2 parts of solid sodium carbonate. The iron sludge is separated by filtration and the filtrate acidified with concentrated hydrochloric acid to give a strongly positive test on Congo Red indicator paper. The solution is reduced by boiling to one-half of its volume and then cooled in an ice bath. The product, 5-methoxy-5'-chloro-4,4'-diaminostilbene-2,2'-disulfonic acid, is isolated by filtration and dried.

*Example 3*

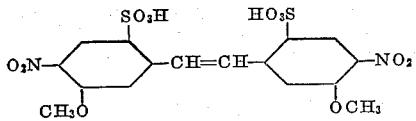

A mixture of 27.4 parts of 94.9% sodium 5-chloro-4-nitrotoluene-2-sulfonate, 143 parts of methanol and 5.7 parts of sodium methylate is heated at reflux until the 5-chloro group has been entirely replaced by a methoxy group. The hot solution is then clarified by filtration and evaporated to dryness.

A mixture of 14.9 parts of the sodium 5-methoxy-4-nitrotoluene-2-sulfonate, obtained above, 26 parts by volume of 30% sodium hydroxide solution and 260 parts of water is warmed to 60° C. To this mixture is added 31 parts by volume of sodium hypochlorite solution of specific gravity 1.210 having 12.3% available chlorine. The mixture is stirred at 60° C. until reaction is complete. To isolate the product, 70 parts of sodium chloride is added and the reaction mixture cooled externally.

The product, 5,5'-dimethoxy-4,4'-dinitrostilbene-2,2'-disulfonic acid, is separated by filtration and dried.

*Example 4*

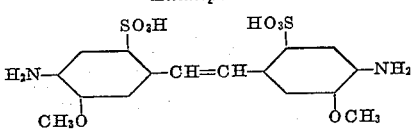

The product of Example 3 is reduced to the corresponding diamino compound by using the procedure of Example 2. The product formed is the 5,5'-dimethoxy-4,4'-diaminostilbene-2,2'-disulfonic acid.

*Example 5*

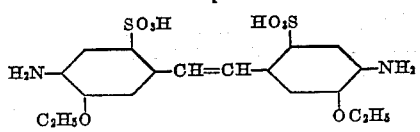

The procedure of Example 3 is followed, using 6.81 parts of sodium ethylate instead of 5.7 parts of sodium methylate. The corresponding 5-ethoxy product is obtained. This product is then oxidized by sodium hypochlorite solution, following the procedure of Example 3, to give the corresponding 5,5'-diethoxy dinitrostilbene disulfonic acid. The latter is then reduced using the procedure of Example 2, to give the 5,5'-diethoxy-4,4'-diaminostilbene-2,2'-disulfonic acid. By the use of sodium butoxide in place of the sodium ethylate, the corresponding butoxy compounds are prepared by these procedures.

*Example 6*

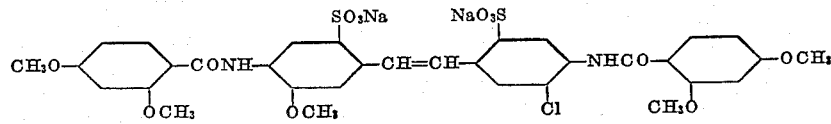

To 60 parts of pyridine is added, 2.64 parts of redistilled thionyl chloride and then 3.64 parts of 2,4-dimethoxybenzoic acid. To this mixture is added 2.7 parts of the product of Example 2. The reaction mixture is heated at reflux until a sample gives a negative test for free amine when diazotized and spotted versus R-salt solution.

After addition of 6 parts of sodium carbonate in 50 parts of water, the pyridine is distilled off with steam. To the remaining solution, 15 parts of salt is added and the reaction mixture cooled. The product, disodium-4,4'-bis-(2,4-dimethoxybenzamido)-5-methoxy-5'-chlorostilbene-2,2'-disulfonate, is isolated by filtration and dried. The product obtained is soluble in water and imparts to cotton a strong greenish blue fluorescence.

*Example 7*

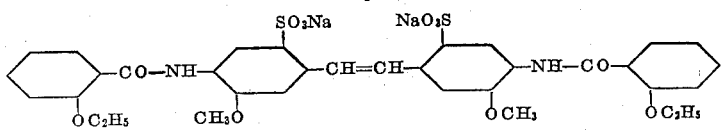

The procedure of Example 6 is followed using an equivalent quantity of o-ethoxybenzoic acid in place of the 2,4-dimethoxybenzoic acid, and the product of Example 4 in place of the product of Example 2. The product formed imparts to cotton a strong greenish blue fluorescence.

*Example 8*

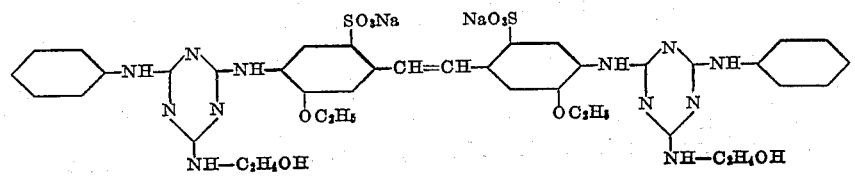

21.4 parts of the product of Example 5 is dissolved in 240 parts of water, 160 parts of acetone is then added and the solution is cooled to 0° C. A second solution of 18.4 parts of cyanuric chloride in 80 parts of acetone is added gradually for the first solution, simultaneously with sufficient sodium carbonate solution to keep the solution approximately neutral during the addition. The mixture is stirred until a reaction is approximately complete. 9.3 parts of aniline is then added slowly to the mixture accompanied by the addition of further portions of sodium carbonate to keep the mixture neutral. The mixture is stirred at 55° C. until this condensation is complete, when 15.3 parts of monoethanolamine is added. The acetone is removed by distillation and replaced with an equal volume of water. The mixture is then stirred at the boil to produce a compound having the above formula. Three hundred parts of water is added and the mixture is further treated after reheating with 71.5 parts of 10% carbonate solution. On cooling the product is isolated by filtration as the sodium salt and washed with 10% brine. The yield is excellent. The free sulfonic acid may be prepared from the sodium salt illustrated above by the addition of an equivalent amount of a strong mineral acid. The acid can of course be converted into its ammonium or alkali metal salt by conventional neutralization with the corresponding base.

*Example 9*

A stock solution of brightener is made by dissolving 100 mg. of brightener in 5 liters of distilled water. Also, a stock soap solution is prepared by dissolving 10 g. of soap powder in 2 liters of distilled water.
Three one-pint laundry jars are used for the test. To the first is added 7.2 cc. of stock brightener solution; to the second is added 8.1 cc. and to the last 9.0 cc. of stock brightener is added. Then to each jar, 100 cc. of stock soap solution is added. Then distilled water is added until the total volume is 150 cc. To each jar is added a 5 g. piece of 80 x 80 cotton. The jars are then closed and placed in a Laundrometer at 130° F. for 25 minutes. At the end of this time the jars are opened and the fabrics rinsed three times in cold water and then dried. The dyed fabric from each jar is then viewed under ultra-violet light. It is found to appear quite white when compared with untreated cloth.

*Example 10*

Using the dye test of Example 9, the brightener derived from the intermediate of Example 4 by the procedure of Example 6 is found to fluoresce a greener shade of blue than a stilbene brightener of similar structure lacking the 5 and 5'-methoxy groups.

*Example 11*

When the intermediate of Example 2 is converted to a brightener by the method of Example 6 and dye tested by the method of Example 9, the cotton cloth fluoresces a greener shade of blue than cloth similarly dye tested using the brightener of the same structure except for presence of chlorines instead of methoxyl groups in the 5 and 5' positions.

*Example 12*

If the intermediate of Example 4 is aroylated with o-ethoxybenzoyl chloride using the method of Example 6 and the resultant brightener dye tested by the method of Example 9, a greener shade fluorescence under U. V. light is observed than is observed from a similar brightener which lacks the methoxy groups in the 5 and 5' positions.

We claim:
1. A compound of the formula:

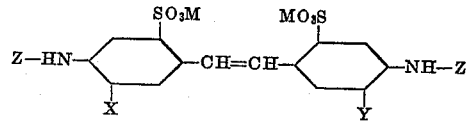

wherein X is lower alkoxy, Y is selected from the group consisting of lower alkoxy, chlorine and bromine, Z is chosen from the group consisting of triazinyl and

radicals in which the Ar is an aromatic radical, and M is chosen from the group consisting of hydrogen, alkali metal cations, and ammonium.

2. Disodium 4,4'-bis-(2,4-dimethoxybenzamido)-5,5'-dimethoxystilbene-2,2'-disulfonate.

3. Disodium 4,4' - bis - (2,4 - dimethoxybenzamido)-5-methoxy-5'-chlorostilbene-2,2'-disulfonate.

4. Disodium 4,4' - bis-(o-ethoxybenzoylamino)-5-methoxy-5'-chlorostilbene-2,2'-disulfonate.

References Cited in the file of this patent
UNITED STATES PATENTS

| | | |
|---|---|---|
| 2,681,926 | Lane et al. | June 22, 1954 |
| 2,687,431 | Marschall | Aug. 24, 1954 |
| 2,688,617 | Hein et al. | Sept. 7, 1954 |
| 2,690,453 | Savidge et al. | Sept. 28, 1954 |